United States Patent [19]

Filipovich

[11] 4,005,447
[45] Jan. 25, 1977

[54] DUAL BEAM RANGEFINDER
[75] Inventor: Danny Filipovich, Chicago, Ill.
[73] Assignee: Bell & Howell Company, Chicago, Ill.
[22] Filed: June 2, 1975
[21] Appl. No.: 582,702
[52] U.S. Cl. .................................. 354/166; 354/155
[51] Int. Cl.² .......................................... G03B 13/20
[58] Field of Search .......... 354/162, 166, 199, 152, 354/155; 356/3, 4

[56] References Cited
UNITED STATES PATENTS

| | | | |
|---|---|---|---|
| 3,041,919 | 7/1962 | Baur et al. | 354/166 X |
| 3,125,623 | 3/1964 | Leitz et al. | 354/166 X |
| 3,397,606 | 8/1968 | Leitz et al. | 354/166 X |
| 3,618,498 | 11/1971 | Eppinger | 354/162 |
| 3,696,724 | 10/1972 | Hartmann | 354/166 X |

Primary Examiner—Edna M. O'Connor
Attorney, Agent, or Firm—James B. Blanchard

[57] ABSTRACT

An improved dual beam rangefinder is used with an optical instrument having an objective lens with an afocal lens cell and a prime lens cell. A pair of spaced reflecting means are positioned intermediate the lens cells to intercept selected portions of the lightrays passing therethrough and transmit these rays to a viewfinder focal plane. One reflecting means is used in conjunction with a masking element which occludes off-axis rays from the reflector such that the reflected image therefrom at the focal plane is of finite size and positioned generally coincident to the central portion thereof.

7 Claims, 5 Drawing Figures

U.S. Patent  Jan. 25, 1977  4,005,447
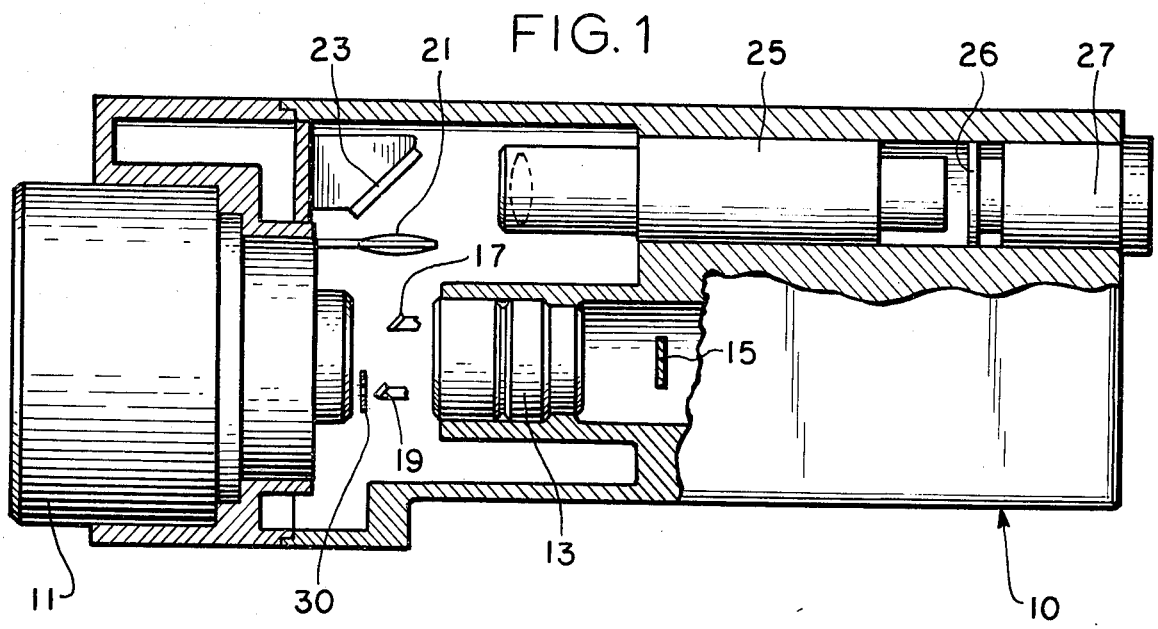
FIG. 1
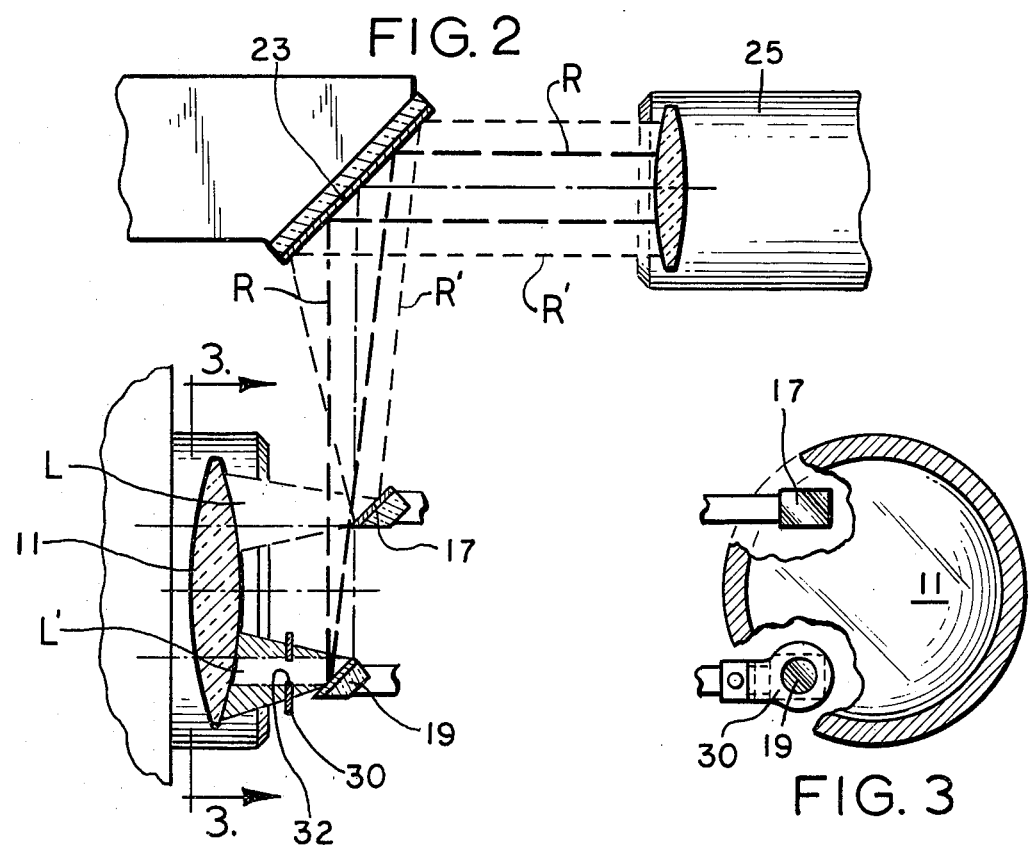
FIG. 2
FIG. 3
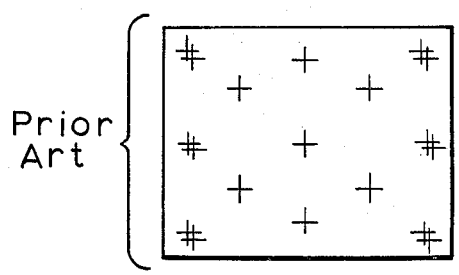
Prior Art
FIG. 4
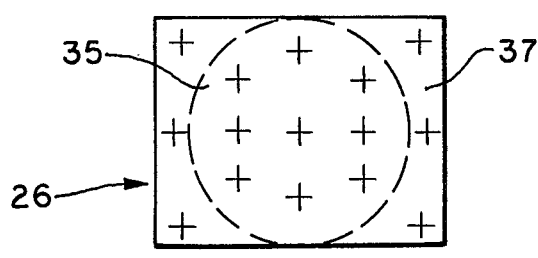
FIG. 5

DUAL BEAM RANGEFINDER

BACKGROUND OF THE INVENTION

The present invention relates generally to optical focusing systems and, more specifically, to an improved dual beam rangefinder suitable for use in a single lens reflex camera.

Various types of rangefinders or focusing system have been proposed and are in use in single lens reflex cameras. One such system which has met with some success is the dual beam rangefinder disclosed in U.S. Pat. No. 3,696,724 issued to Hartmann. This dual beam rangefinder includes two reflecting means that are mounted between the zoom or afocal lens portion and the prime lens portion of an objective lens so as to reflect lightrays from the scene to be photographed into the viewfinder of the camera. The reflecting means are offset from the optical axis of the camera and project separate reflected images which are received by an optical system forming a part of the viewfinder. When the images from the reflecting means are superimposed on the focal plane of the viewfinder, the lens system of the camera is in focus. When the images are not superimposed, the lens system is out-of-focus and must be changed.

While such dual beam rangefinders provide several advantages over other prior art focusing systems, they have not been entirely satisfactory. For example, because the reflecting means are displaced from the optical axis of the lens, each of the images received at the plane of the viewfinder is slightly distorted. Moreover, since the reflecting means are positioned in spaced relationship and at generally opposed peripheral areas of the optical path, the images are distorted in opposite directions. Similarly, due to the inability to mount the reflecting means in exact parallel alignment, slight rotation of each reflected image occurs, relative to the other, which cannot be compensated through adjustment of the lens or viewfinder system. As a result of the distortion and rotation of the reflected images it is impossible to superimpose the two images over the entire field of the viewfinder focal plane. Thus, even when the objective lens of the camera is in focus on the object to be photographed, the two reflected images are not in complete superimposition at the plane in the viewfinder. Actually, when the objective lens are focused on the subject, the central portions of the reflected images will appear properly superimposed, or in focus, at the plane of the viewfinder, but the distortion and rotational effects become more apparent further from the optical axis of the viewfinder such that the peripheral areas of the reflected images will appear to be out of focus. Of course, the inability to obtain complete superimposition of the two reflected images over the full field of the viewfinder plane is undesirable in that it may adversely affect rangefinder accuracy and viewfinder clarity. In addition, the non-focused peripheral areas of the viewfinder images may prove irritating to the user of the camera.

SUMMARY OF THE INVENTION

It is, therefore, an object of the present invention to provide an improved rangefinder system.

It is also an object of this invention to provide an improved dual beam rangefinder suitable for use in a single lens reflex camera.

It is still another object of this invention to provide an improved dual beam rangefinder including a pair of reflecting means located to intercept the lightrays from the optical path of the objective lens for use in the rangefinder and wherein one of said reflecting means receives and reflects only selected lightrays in the optical path so as to eliminate the lack of clarity and focus in the peripheral areas of the viewfinder focal plane.

According, the present invention generally comprises an improved dual beam rangefinder system in which means are provided for reflecting to a viewfinder system of a camera or other optical instrument selected portions of the lightrays from the optical path of the objective lens thereof. One of the reflecting means, however, is used in conjunction with a masking element such that only certain of the lightrays from the optical path are received thereon and reflected to the viewfinder system. More specifically, it has been found that where a substantial number of the off-axis lightrays are occluded or masked from the one reflecting means the resulting reflected image transmitted to the plane of the viewfinder is of finite size and is generally coincident with only the central portion of the viewfinder plane. The "spot-type" image so received at the viewfinder focal plane from the masked reflecting means is then used with the full field image from the other reflecting means to provide accurate rangefinding through their superimposition in the central portion of the viewfinder plane. At the same time, however, since only one image is received at the peripheral areas of the viewfinder plane; namely, the image from the other reflecting means, the peripheral areas always appear in focus. In this manner, when the objective lens of the camera is in focus on the subject to be photographed, a high clarity image is obtained across the full field of the viewfinder focal plane.

BRIEF DESCRIPTION OF THE DRAWINGS

The novel features which are believed to be characteristic of the invention are set forth in the appended claims. The invention itself, however, together with further objects and attendant advantages thereof will be best understood by reference to the following description taken in connection with the accompanying drawings in which:

FIG. 1 is an elevational view in partial cross-section showing a preferred embodiment of the invention located between a zoom lens and a prime lens in a camera;

FIG. 2 is a schematic optical diagram illustrating the transmission of the selected lightrays from the optical path of the camera in accordance with the present invention;

FIG. 3 is a cross-sectional view taken along line 3—3 of FIG. 2 and showing in greater detail a preferred installation of the present invention;

FIG. 4 is a schematic representation of the reflected images received at the viewfinder focal plane in a prior art dual beam rangefinder system; and FIG. 5 is a schematic representation of the reflected images received at the focal plane of the present invention.

DETAILED DESCRIPTION OF THE INVENTION

In accordance with the present invention, the improved dual beam rangefinder system is provided to facilitate the focusing of an objective lens of a camera, or other optical instrument on a subject. In the preferred embodiment of the invention illustrated in FIG. 1, a dual beam rangefinder is used in conjunction with a single lens reflex camera designated generally as 10. The objective lens of the camera 10 includes a first lens cell or zoom lens portion 11 and a second lens cell or prime lens portion 13. The zoom lens portion 11 of the objective lens may be any suitable zoom lens of an afocal lens system, which can be moved in any well-known manner, such as by the operation of an electric motor or by manual adjustment. The prime lens portion 13 may be any conventional camera lens that will image a scene viewed by the zoom lens 11 at a film plane 15.

The dual beam rangefinder system includes a primary peek-in mirror 17; a secondary peek-in mirror 19; a viewfinder/rangefinder objective lens 21; a reflecting mirror structure 23; a rangefinder lens system 25; a viewfinder focal plane 26; and an eyepiece 27.

In accordance with the present invention, one of the reflecting means, for example, the secondary peek-in mirror 19 shown in FIG. 1, is associated with a means for occluding or masking a substantial portion of the off-axis lightrays in the optical path of the objective lens from transmission to and reflection from its associated reflecting means. A preferred masking means, illustrated in FIG. 1, is an opaque plate 30 having an aperture 32 therein, the plate 30 being positioned between the zoom lens 11 and the peek-in mirror 19 and spaced a sufficient distance from the mirror 19 such that the lightrays in the optical path which pass therethrough and strike the peek-in mirror 19 are generally parallel to the optical axis of the objective lens. This arrangement results in the transmission of an image from the peek-in mirror 19 to the rangefinder lens system 25 which is of finite size and which falls generally co-incident to the central portion of the focal plane 26.

As is more clearly illustrated in the FIG. 2 selected portions L and $L^1$ of the rays in the optical path of the objective lens are reflected by means of peek-in mirrors 17 and 19 and transmitted thereby to the range-finder lens system 25 via reflecting mirror structure 23. Those lightrays L reflected by the primary peek-in mirror 17 include both off-axis lightrays and lightrays generally parallel to the optical axis of the objective lens which together, upon transmission to focal plane 26, form a full-field image thereon. In prior art dual beam rangefinder systems another selected portion of both off-axis and generally axial lightrays from the optical path would be transmitted by secondary peek-in mirror 19 to the focal plane 26 of the rangefinder lens system 25 also as a full field image. As has been discussed hereinabove, the superimposition of the two full field reflected images produces double images in the peripheral areas of the viewfinder focal plane even when the objective lens is properly adjusted to focus an image of the remote subject at the film plane 15. This condition is schematically represented by FIG. 4, and is caused, as discussed hereinabove, due to the distortion and rotation of each image reflected by the primary and secondary peek-in mirrors.

This problem is simply and expeditiously overcome by the present invention through the positioning of the apertured plate 30 between the primary lens cell 11 and the secondary peek-in mirror 19. The aperture 32 in the opaque plate 30 is of an appropriate size and the plate itself is displaced at an appropriate distance from peek-in mirror 19 such that a sufficient amount of the off-axial lightrays in the optical path are masked from the peek-in mirror 19 to insure that the image transmitted to the focal plane 26 is of a finite size which is generally coincident to the central portion of a focal plane 26.

The arrangement of these components of the present invention and the transmission of the selected lightrays to the rangefinder system are schematically illustrated in FIG. 2. The shaded portions of the lightrays $L^1$ represent the off-axis rays blocked from passage to the peek-in mirror 19; the heavy lines R represent the reflected rays from mirror 19 which form the finite image in the rangefinder/viewfinder system; and the lines $R^1$ represent the reflected rays from mirror 17 which form the full field image therein.

Of course, the specific size of the aperture 32 and the specific placement of the opaque plate 30 will depend upon the specific geometrical and dimensional relationships of the component optical parts of the dual beam rangefinder system, all of which will be readily apparent to those skilled in the art.

It is particularly preferred that the masking means utilized in the practice of the present invention be arranged to transmit from its associated reflecting means an image which is no larger than about three-fifths the diagonal dimension of the viewfinder focal plane. This arrangement assures a sufficient central portion for proper rangefinder accuracy while, at the same time, eliminating the most noticeable double imaging in the peripheral areas of the focal plane.

As a result of the spot-type image produced by the lightrays reflected from the secondary peek-in mirror 19 a high-clarity image will be obtainable across the full field of the viewfinder focal plane 26. Thus, as is schematically represented by FIG. 5, the full field image reflected from peek-in mirror 17 and the finite spot-type image reflected from peek-in mirror 19 will superimpose within the central portion 35 of the focal plane thereby permitting appropriate focusing of the objective lens of the camera 10. At the same time, the peripheral area 37 of the focal plane 26 will show only the full field image reflected from the peek-in mirror 17, eliminating the double-image in the peripheral area and thereby showing a properly focused image throughout the field of the focal plane.

As noted hereinabove, the peek-in mirrors 17 and 19, are mounted so as to intercept a portion of the lightrays in the optical path. These mirrors will also, in some instances, intersect some of the lightrays which are intended for image forming at the film plane. Still the amount of light so masked from the film is at most only about 14% of the total film plane, image forming light. This constitutes significant improvement over beam-splitting rangefinders which use approximately 25% of the film plane, image forming light.

Of course, there are a variety of means available for mounting the peek-in mirrors and the disclosure thereof in U.S. Pat. No. 3,696,724 to Hartmann is hereby incorporated herein by reference. Similarly, several mechanical or structural arrangements will be readily apparent to those skilled in the art for mounting the masking means disclosed herein, and it is not intended to limit the present invention to any such specific mounting arrangement.

In accordance with another preferred embodiment of the present invention, the secondary peek-in mirror 19 is provided with a highly reflective gold plating, or other similar surface treatment, in order to highlight or emphasize the central portion of the focal plane 26 wherein the substantially complete superimposition of the two-reflected images indicates that the objective lens of the camera 10 is properly focused on the remote subject to be photographed.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. In a single lens reflex camera having a viewfinder system and an objective lens defining an optical path between first and second lens cells, said first lens cell transmitting light rays along said optical path, a rangefinder system to facilitate focusing said objective lens on a subject, the rangefinder system comprising:
   a first means mounted in said optical path between the lens cells of said objective lens for reflecting a portion of said light rays in a predetermined direction;
   a second means mounted in said optical path between the lens cells of said objective lens for reflecting another portion of said light rays in a predetermined direction;
   an optical system arranged in said camera to receive the light rays reflected by said first and second reflecting means to form a superimposed image in a predetermined plane in said viewfinder system when the objective lens is in focus on the subject and to form separate images in said plane when the objective lens is not focused on the subject; and
   means mounted in said optical path for masking from one of said reflecting means a sufficient amount of the off-axis light rays otherwise incident thereto to restrict the transmission of the image from said one reflecting means to a finite central portion of the predetermined plane of said viewfinder, thereby limiting the superimposition of said images to said central portion.

2. The camera rangefinder system of claim 1 wherein said masking means is adapted to permit said one reflecting means to reflect in said predetermined direction substantially only those lightrays incident thereto which are generally parallel to the optical axis of said objective lens.

3. The camera rangefinder system of claim 1 wherein said masking means comprises an opaque plate having an aperture therein and mounted between the first lens cell of said objective lens and said one reflecting means.

4. The camera rangefinder system of claim 1 wherein the predetermined plane of said viewfinder has a finite diagonal dimension and wherein said masking means includes means for limiting the lightrays reflected by said one reflecting means to an amount sufficient to provide at said central portion of the predetermined plane an image having a maximum dimension less than about three-fifths of said diagonal dimension.

5. The camera rangefinder system of claim 1 wherein said first and second reflecting means are mirrors.

6. The camera rangefinder system of claim 5 wherein said one reflecting means comprises a mirror having a surface treatment which provides a contrast between said central portion and the peripheral areas of said viewfinder plane.

7. In a single lens reflex camera having an objective lens defining an optical path between first and second lens cells, said first lens cell transmitting light rays along said optical path; a combined viewfinder and rangefinder system including first and second means mounted in said optical path between the lens cells of said objective lens for reflecting first and second portions of said light rays, respectively; and an optical system arranged to receive the reflected first and second portions of said light rays to form first and second full field images, respectively, in a predetermined plane in said viewfinder-rangefinder system, said first and second images to form a single superimposed image in said plane when the objective lens of said camera is in focus on the subject and to form separate images in said plane when the objective lens is not focused on the subject; the improvement comprising:
   means mounted in said optical path between said first lens cell and one of said reflecting means for restricting the image formed by the portion of said light rays reflected by said one reflecting means to a portion of the plane of said viewfinder-rangefinder system less than the full field thereof.

* * * * *